US009721396B2

(12) United States Patent
Baba

(10) Patent No.: US 9,721,396 B2
(45) Date of Patent: Aug. 1, 2017

(54) COMPUTER AND COMPUTER SYSTEM FOR CONTROLLING OBJECT MANIPULATION IN IMMERSIVE VIRTUAL SPACE

(71) Applicant: COLOPL, Inc., Tokyo (JP)

(72) Inventor: Naruatsu Baba, Tokyo (JP)

(73) Assignee: COLOPL, Inc., Tokyo (JP)

( * ) Notice: Subject to any disclaimer, the term of this patent is extended or adjusted under 35 U.S.C. 154(b) by 0 days.

(21) Appl. No.: 15/286,084

(22) Filed: Oct. 5, 2016

(65) Prior Publication Data

US 2017/0024935 A1 Jan. 26, 2017

Related U.S. Application Data

(63) Continuation of application No. PCT/JP2016/057822, filed on Mar. 11, 2016.

(30) Foreign Application Priority Data

Mar. 17, 2015 (JP) .................................. 2015-052897

(51) Int. Cl.
*G09G 5/00* (2006.01)
*G06T 19/20* (2011.01)
(Continued)

(52) U.S. Cl.
CPC ............ *G06T 19/20* (2013.01); *A63F 13/211* (2014.09); *A63F 13/213* (2014.09); *A63F 13/25* (2014.09);
(Continued)

(58) Field of Classification Search
CPC .......... G06F 1/163; G06F 3/005; G06F 3/012; G06F 3/013; G06F 3/014; G06F 3/0346;
(Continued)

(56) References Cited

U.S. PATENT DOCUMENTS 8,308,563 B2 * 11/2012 Ikeda ...................... A63F 13/06
463/36
8,482,527 B1 * 7/2013 Kim ........................ G06F 3/011
345/168
(Continued)

FOREIGN PATENT DOCUMENTS

JP 2005-107963 A 4/2005
JP 2006227934 A * 8/2006
(Continued)

*Primary Examiner* — Joe H Cheng
(74) *Attorney, Agent, or Firm* — Mots Law, PLLC

(57) ABSTRACT

Action of a head around which an HMD main body is worn is related to manipulation of an object in an immersive three-dimensional virtual space. Information on a sight in a virtual space may be determined based on information on head inclination sensed with an inclination sensor; an image of the sight in the virtual space may be generated based on the sight information in order to display the sight image in the head mounted display; an object placed on a reference sight line in the virtual space may be identified, the reference sight line being determined in correspondence with a predetermined position in the sight image; and an object the identified object may be manipulated in response to the identification of the object in accordance with action of inclining in a predetermined direction the head around which the head mounted display is worn.

11 Claims, 14 Drawing Sheets

(51) Int. Cl.
*G06F 3/01* (2006.01)
*G06F 3/033* (2013.01)
*G06F 3/0484* (2013.01)
*A63F 13/428* (2014.01)
*A63F 13/525* (2014.01)
*A63F 13/213* (2014.01)
*A63F 13/25* (2014.01)
*G06F 3/00* (2006.01)
*G06F 3/041* (2006.01)
*A63F 13/26* (2014.01)
*A63F 13/211* (2014.01)
*G06T 19/00* (2011.01)
*G02B 27/01* (2006.01)

(52) U.S. Cl.
CPC ............ *A63F 13/26* (2014.09); *A63F 13/428* (2014.09); *A63F 13/525* (2014.09); *G02B 27/017* (2013.01); *G06F 3/005* (2013.01); *G06F 3/01* (2013.01); *G06F 3/012* (2013.01); *G06F 3/013* (2013.01); *G06F 3/033* (2013.01); *G06F 3/0416* (2013.01); *G06F 3/0484* (2013.01); *G06T 19/006* (2013.01); *A63F 2300/8082* (2013.01)

(58) Field of Classification Search
CPC ........ G06F 3/041; G06F 3/04842; G06F 3/14; G06F 2203/0339; G06F 2203/0383; G02B 27/01; G02B 27/0101; G02B 27/017; G02B 2027/0178; G02B 2027/0187; G06T 7/004; G06T 19/20
See application file for complete search history.

(56) References Cited

U.S. PATENT DOCUMENTS

| | | | |
|---|---|---|---|
| 2006/0044265 A1* | 3/2006 | Min | G02B 27/017 345/156 |
| 2006/0256110 A1* | 11/2006 | Okuno | G06F 3/0346 345/419 |
| 2010/0079356 A1* | 4/2010 | Hoellwarth | G02B 27/017 345/8 |
| 2011/0140994 A1* | 6/2011 | Noma | G02B 27/017 345/8 |
| 2013/0044128 A1* | 2/2013 | Liu | G09G 5/00 345/633 |
| 2013/0083173 A1* | 4/2013 | Geisner | G06F 3/013 348/51 |
| 2013/0342564 A1* | 12/2013 | Kinnebrew | G09B 3/003 345/619 |
| 2014/0002444 A1* | 1/2014 | Bennett | G06F 3/012 345/419 |
| 2014/0078176 A1* | 3/2014 | Kim | G06F 3/017 345/633 |
| 2014/0146394 A1* | 5/2014 | Tout | G09G 9/307 359/630 |
| 2014/0152558 A1 | 6/2014 | Salter et al. | |
| 2015/0002507 A1* | 1/2015 | Ambrus | G02B 27/017 345/419 |
| 2015/0007114 A1* | 1/2015 | Poulos | G06F 3/012 715/852 |
| 2015/0035822 A1* | 2/2015 | Arsan | G06T 19/006 345/419 |
| 2015/0370335 A1 | 12/2015 | Tsukahara et al. | |
| 2016/0018885 A1 | 1/2016 | Kimura et al. | |
| 2016/0180595 A1* | 6/2016 | Grossinger | G06F 3/011 345/419 |
| 2016/0252730 A1* | 9/2016 | Ikeda | G02B 27/017 |

FOREIGN PATENT DOCUMENTS

| | | |
|---|---|---|
| JP | 2008-033891 A | 2/2008 |
| JP | 2013-258614 A | 12/2013 |
| JP | 2014-164449 A | 9/2014 |
| JP | 2014-174747 A | 9/2014 |
| JP | 2015-150063 A | 8/2015 |
| JP | 2015-231445 A | 12/2015 |
| WO | 2014/085789 A1 | 6/2014 |

* cited by examiner

| EXTERNAL CONTROLLER ACTION \ HMD ACTION | UPWARD OR DOWNWARD INCLINATION | ... |
|---|---|---|
| TAPPING | RELEASE OBJECT | ... |
| SWIPING | ROTATE OBJECT | ... |
| HOLDING | MOVE OBJECT UPWARD OR DOWNWARD | ... |
| (NO ACTION) | MOVE OBJECT FRONTWARD OR REARWARD | ... |

US 9,721,396 B2

COMPUTER AND COMPUTER SYSTEM FOR CONTROLLING OBJECT MANIPULATION IN IMMERSIVE VIRTUAL SPACE

CROSS REFERENCE TO RELATED APPLICATIONS

This application is a continuation application of International Application No. PCT/JP2016/057822, filed on Mar. 11, 2016, entitled "COMPUTER PROGRAM AND COMPUTER SYSTEM FOR CONTROLLING OBJECT MANIPULATION IN IMMERSIVE VIRTUAL SPACE", which claims priority based on the Article 8 of Patent Cooperation Treaty from prior Japanese Patent Application No. 2015-052897, filed on Mar. 17, 2015, the entire contents of which are incorporated herein by reference.

TECHNICAL FIELD

The present disclosure relates to a computer program and a computer system for controlling object manipulation in an immersive virtual space. The present disclosure relates more specifically to a computer program and a computer system that cause a computer to control object manipulation in such a way that an object placed in an immersive virtual space can be manipulated through head mounted display (HMD)/head operation using an HMD worn around a user's head and operation of a controller held by the user.

BACKGROUND ART

There is a known HMD that is worn around a user's head and can present the user with an image in a virtual space with the aid of a display or any other device disposed in front of the user. In particular, the HMD disclosed in Patent Document 1 can display a 360-degree panoramic image in a three-dimensional virtual space. Such an HMD typically includes a variety of sensors (an acceleration sensor and an angular velocity sensor, for example) and measures data on the attitude of an HMD main body. In particular, the direction of the sight line of the eyes looking at the panoramic image can be changed in accordance with information on the angle of rotation of the head. That is, when the user who wears the HMD rotates his/her own head, the direction of the sight line of the eyes looking at the 360-degree panoramic image is changed accordingly, whereby the user's immersive sensation in the video world is enhanced for improvement in entertainment quality (see paragraphs [0004], [0005], [0006], and [Abstract] of Patent Document 1).

Patent Document 1 further discloses that the user's gesture in the form of motion of the head is related in advance to operation (display screen switching, for example) on the screen of the HMD, and when the user's gesture is identified on the basis of the inclination of the head or the acceleration thereof, screen operation related to the gesture is performed. Inconvenience in controller operation resulting from the fact that the user who wears the HMD is unable to see his/her own hands and therearound is therefore solved (see paragraphs [0008] to [0009] in Patent Document 1).

CITATION LIST

Patent Document

[Patent Document 1] Japanese Patent Laid-Open No. 2013-258614

The above disclosure in the Patent Document 1, however, merely describes use of information on head action acquired with a sensor to identify the sight of the panoramic image or to identify the user's gesture. It is expected in the future that a large number of various applications that support an immersive virtual space using an HMD will be developed for widespread use of an HMD.

In a game application of related art using no HMD, complicated operation of a controller is typically required in many cases, and there is a concern about difficulty in operation of the controller due to the fact that the user who wears the HMD is unable to see his/her own hands and therearound. In this regard, in an immersive virtual space based on an HMD, information on head action is expected to be applied to a variety of scenes during the startup of an application in addition to the advantageous effect described above.

As an example, assume an application in which an object placed in a three-dimensional virtual space is manipulated. In the following detailed description of the present disclosure, in particular, assume a building block game application that allows manipulation of building block objects placed in an immersive three-dimensional virtual space, such as those shown in FIGS. 11 to 13. Action of the head around which an HMD main body is worn is related to manipulation of moving a building block object in a specific direction or any other manipulation, whereby action of the HMD allows manipulation of the building block object.

SUMMARY

Technical Problem

An object of the present disclosure is to readily allow object manipulation in an immersive three-dimensional virtual space by relating action of a head around which an HMD main body is worn to specific manipulation of an object placed in the three-dimensional virtual space.

Solution to Problem

A computer program according to the present disclosure that causes a computer to control object manipulation in an immersive virtual space causes the computer to function as: a sight determination section that determines information on a sight in the virtual space based on information on inclination sensed with an inclination sensor provided in a head mounted display connected to the computer; an image generation section that generates an image of the sight in the virtual space based on the sight information in order to display the sight image in the head mounted display; an object identification section that identifies an object placed on a reference sight line in the virtual space, the reference sight line being determined in correspondence with a predetermined position in the sight image; and an object manipulation section that manipulates the identified object in response to the identification of the object in accordance with action of inclining the head mounted display in a predetermined direction.

The computer program according to the present disclosure may cause the sight determination section to determine the sight information based further on information on a position of the head mounted display that is sensed with a position sensor connected to the computer and capable of sensing the head mounted display.

Further, the computer program according to the present disclosure may cause the object manipulation section to manipulate the identified object in cooperation with an external controller connectable to the computer. Moreover, the external controller may include a touch display, and the manipulation performed on the identified object is performed in accordance with touch action including any of tapping, swiping, and holding performed on the touch display.

A computer system according to the present disclosure for object manipulation in an immersive virtual space includes a computer and a head mounted display connected to the computer and including an inclination sensor, and the computer determines information on a sight in the virtual space based on information on inclination sensed with the inclination sensor, generates an image of the sight in the virtual space based on the sight information in order to display the sight image in the head mounted display, identifies an object placed on a reference sight line in the virtual space, the reference sight line being determined in correspondence with a predetermined position in the sight image, and manipulates the identified object in response to the identification of the object in accordance with action of inclining the head mounted display in a predetermined direction.

According to the present disclosure, simple action of the head of a user who wears an HMD readily allows object manipulation in an immersive three-dimensional virtual space without complicated controller action required in related art. Further, combining head action using the HMD with controller action allows more complicated object manipulation. The present disclosure can therefore provide a novel game operation aspect in a game application using an HMD.

The features and advantageous effects of the present disclosure described above and other features and advantageous effects thereof will be apparent from the following more specific description of examples of the present disclosure, the accompanying drawings, and claims.

BRIEF DESCRIPTION OF THE DRAWINGS

FIG. 9 is an outline view showing an example of correspondence between object manipulation and an action of a user according to at least one embodiment.

DESCRIPTION OF EMBODIMENTS

Figure 1:
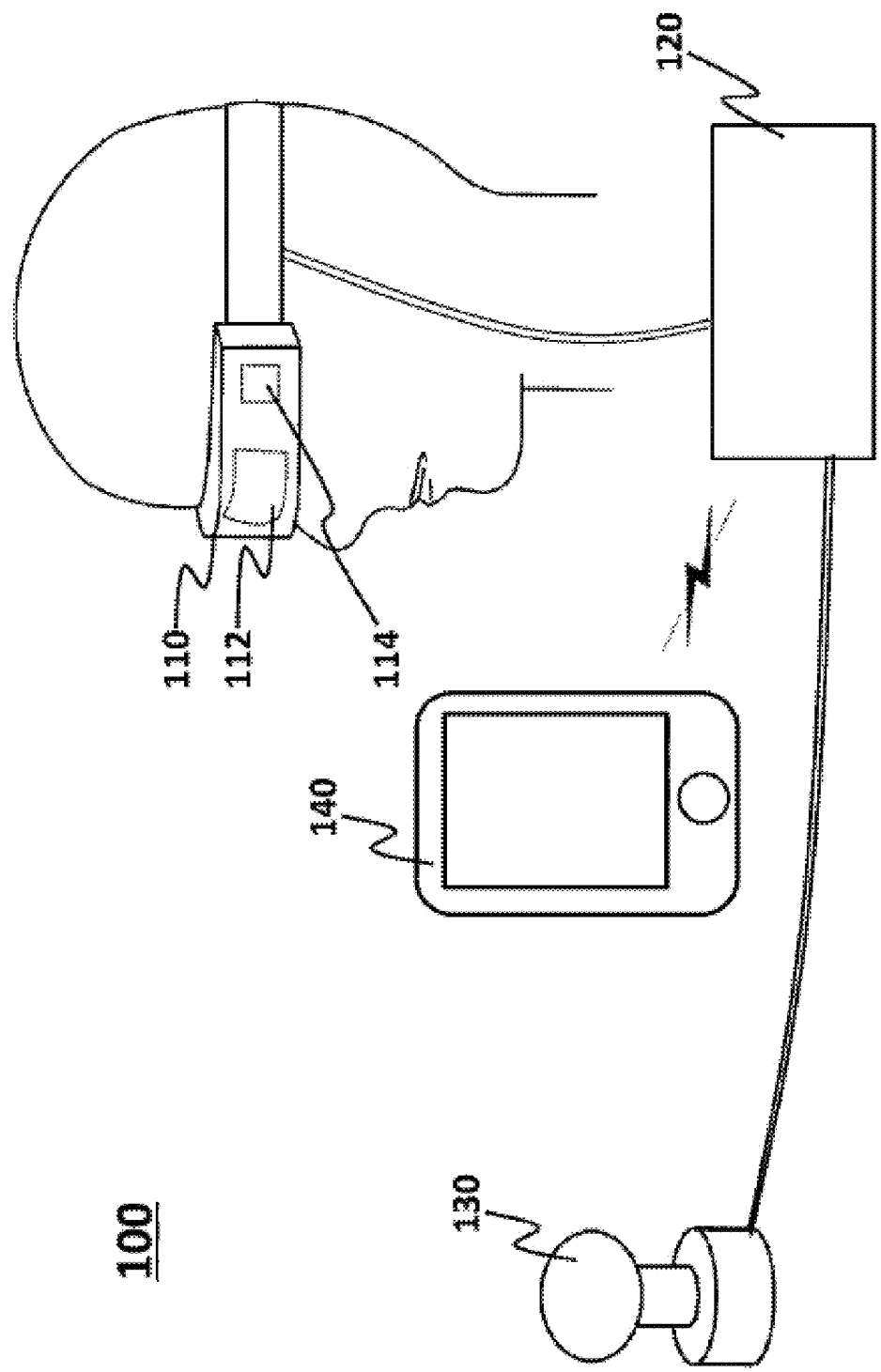
FIG. 1 is a diagrammatic view of an HMD system according to at least one embodiment.

A computer program that causes a computer to control object manipulation in an immersive virtual space and a computer system for object manipulation in an immersive virtual space according to at least one embodiment will be described below with reference to the drawings. In the drawings, the same components are labeled with the same reference characters.

FIG. 1 is an overall schematic view of a head mounted display (hereinafter referred to as "HMD") system 100 using an HMD according to at least one embodiment. The HMD system 100 includes an HMD main body 110, a computer (control circuit section) 120, a position tracking camera (position sensor) 130, and an external controller 140, as shown in FIG. 1.

The HMD 110 includes a display 112 and a sensor 114. The display 112 is a non-transmissive display device configured so as to completely cover a user's sight, and the user is thereby allowed to view only a screen displayed in the display 112. Since the user who wears the non-transmissive HMD 110 entirely loses sight of the outside world, there is achieved a display aspect in which the user is completely immersed in a virtual space displayed by an application executed in the control circuit section 120.

Figure 2:
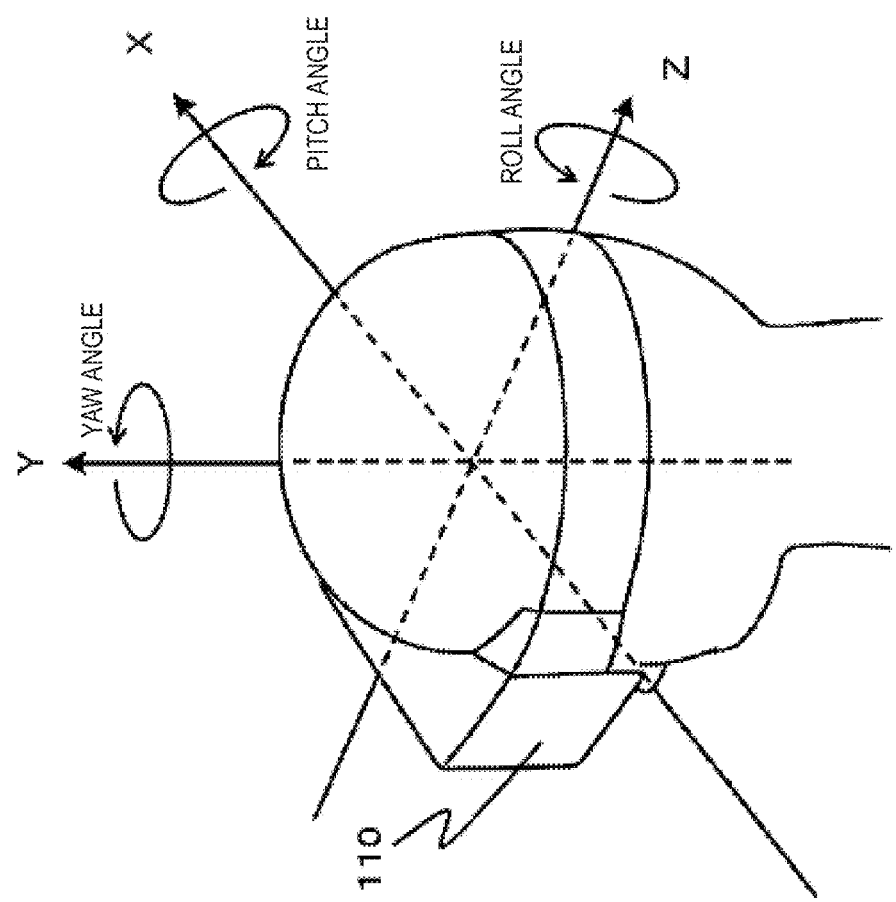
FIG. 2 shows an orthogonal coordinate system in an actual space defined with respect to the center of the head of a user who wears the HMD shown in FIG. 1.

The sensor 114 provided in the HMD 110 is fixed to a portion in the vicinity of the display 112. The sensor 114 includes a terrestrial magnetism sensor, an acceleration sensor, and/or an inclination (angular velocity, gyro) sensor and can sense a variety of types of motion of the HMD 110 (display 112) worn around the user's head by using at least one of the sensors. The angular velocity sensor, in particular, can sense angular velocities of the HMD 110 around the three axes thereof in a time course in accordance with motion of the HMD 110 and determine a temporal change in angle (inclination) around each of the axes, as shown in FIG. 2.

Angular information data that can be sensed with the inclination sensor will be described with reference to FIG. 2. XYZ coordinates are defined with respect to the head of the user who wears the HMD, as shown in FIG. 2. The Y axis extends in the vertical direction in which the user stands up. The Z axis is orthogonal to the Y axis and extends in the direction in which the center of the display 112 and the user are connected to each other. The X axis is an axis extending in the direction orthogonal to the Y axis and the Z axis. The inclination sensor senses an angle around each of the axes (that is, inclination determined by the yaw angle representing rotation about the Y axis, the pitch angle representing rotation about the X axis, and the roll angle representing rotation about the Z axis), and a motion sensing section 210 determines angular (inclination) information data as information on the sight on the basis of the time-course change.

Referring back to FIG. 1, the computer 120 provided in the HMD system 100 functions as the control circuit section 120 that causes the user who wears the HMD to be immersed in a three-dimensional virtual space and further causes the user to perform action based on the three-dimensional virtual space. The control circuit section 120 may be configured as hardware separate from the HMD 110, as shown in FIG. 1. The hardware can be a computer, such as a personal computer or a server computer that operates over a network. That is, the hardware can be an arbitrary computer including a CPU, a main storage, an auxiliary storage, a transceiver, a display section, and an input section connected to each other via a bus.

The control circuit section 120 may instead be accommodated as an object manipulator in the HMD 110. In this case, the control circuit section 120 can implement the entirety or only some of the functions of the object manipulator. In the case where only some of the functions are implemented, the remaining functions may be implemented in the HMD 110 or a server computer (not shown) that operates over a network.

The position tracking camera (position sensor) 130 provided in the HMD system 100 is so connected to the control circuit section 120 that they can communicate with each other and has the function of tracking the position of the HMD 110. The position tracking camera 130 is achieved by using an infrared sensor and a plurality of optical cameras. The HMD system 100, which includes the position tracking camera 130 and senses the position of the HMD around the user's head, can accurately relate the virtual space positions of the virtual camera/immersed user in the three-dimensional virtual space to each other and identify the virtual space positions.

Figure 3:
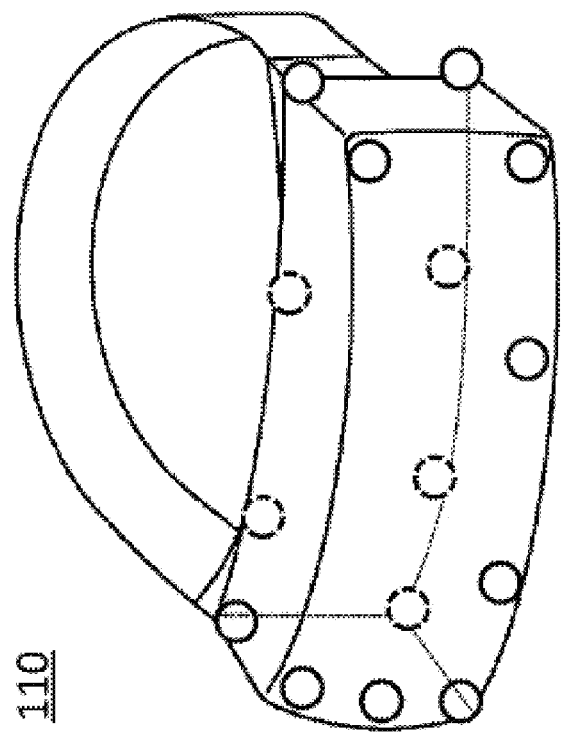
FIG. 3 is an outline view showing a plurality of sensing points virtually provided on the HMD and sensed with a position tracking camera.

More specifically, the position tracking camera 130 is virtually provided on the HMD 110, as shown in FIG. 3 by way of example, and senses, in a time course in correspondence with the user's motion, actual space positions of a plurality of sensing points where infrared light is sensed. A temporal change in the angle around each of the axes according to the motion of the HMD 110 can then be determined on the basis of the time-course change in the actual space positions sensed by the position tracking camera 130.

Referring back to FIG. 1, the HMD system 100 includes the external controller 140. The external controller 140 is a typical user terminal and can be a smartphone shown in FIG. 1 but is not limited thereto. The external controller 140 can instead, for example, be a portable device terminal including a touch display, such as a PDA, a tablet computer, a game console, or a notebook PC. That is, the external controller 140 can be an arbitrary portable device terminal including a CPU, a main storage, an auxiliary storage, a transceiver, a display section, and an input section connected to each other via a bus. The user can perform a variety of types of touch action including tapping, swiping, and holding on the touch display of the external controller 140.

Figure 4:
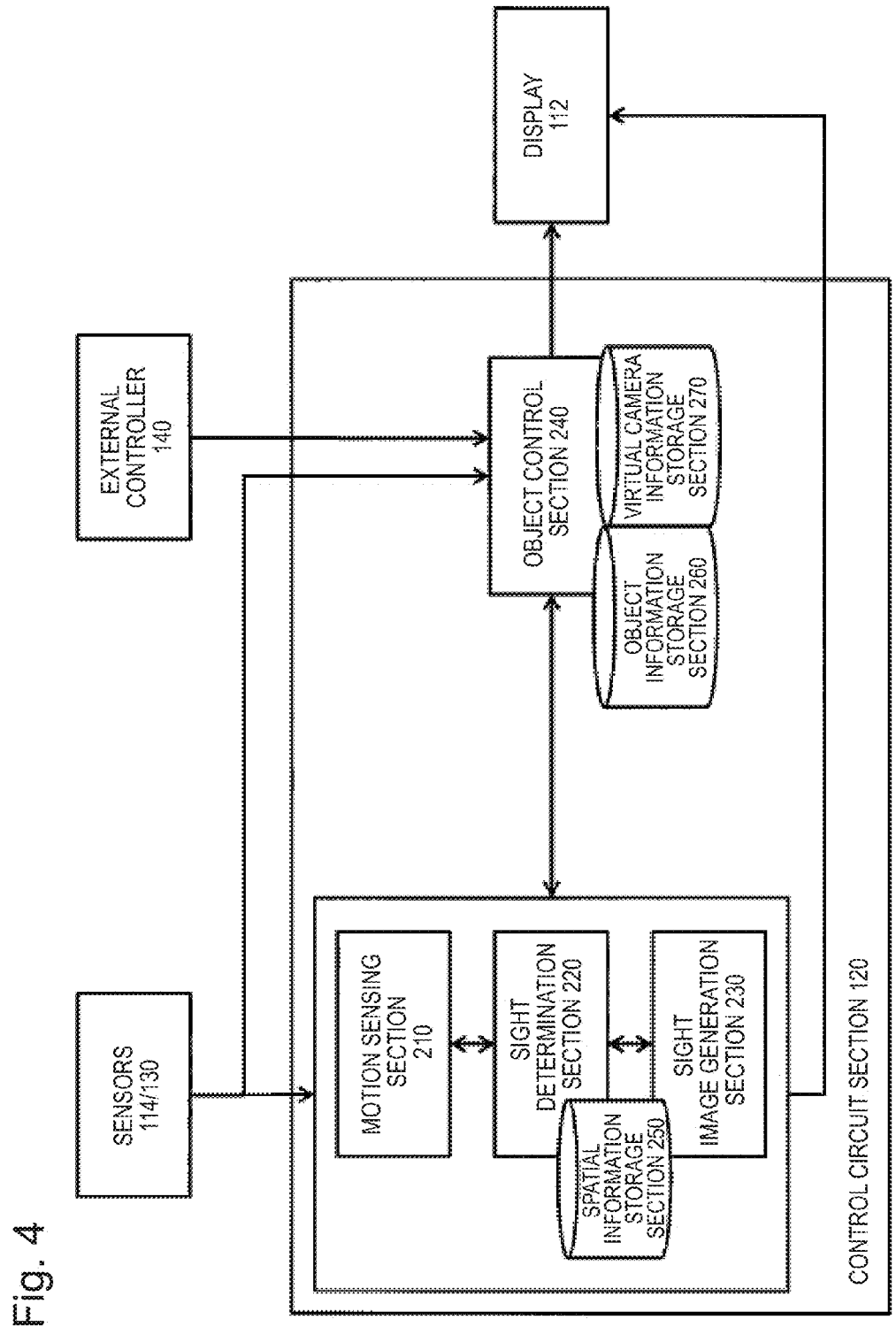
FIG. 4 is a block diagram showing a functional configuration for implementing object manipulation in a three-dimensional virtual space according to at least one embodiment.

The block diagram of FIG. 4 shows the configuration of primary functions of the control circuit section 120 and other components therearound to implement object manipulation in the three-dimensional virtual space according to at least one embodiment. The control circuit section 120 primarily receives inputs from the sensors 114/130 and the external controller 140, processes the inputs, and outputs results of the processing to the display 112. The control circuit section 120 primarily includes the motion sensing section 210, a sight determination section 220, a sight image generation section 230, and an object control section 240 and interacts with a variety of tables in a spatial information storage section 250, an object information storage section 260, a virtual camera information storage section 270, and other sections to process a variety of pieces of information.

The motion sensing section 210 measures data on motion of the HMD 110 worn around the user's head on the basis of motion information inputted from the sensors 114/130. In at least one embodiment, in particular, angular information sensed in a time course with the inclination sensor 114 and position information sensed in a time course with the position tracking camera 130 are determined.

Figure 11:
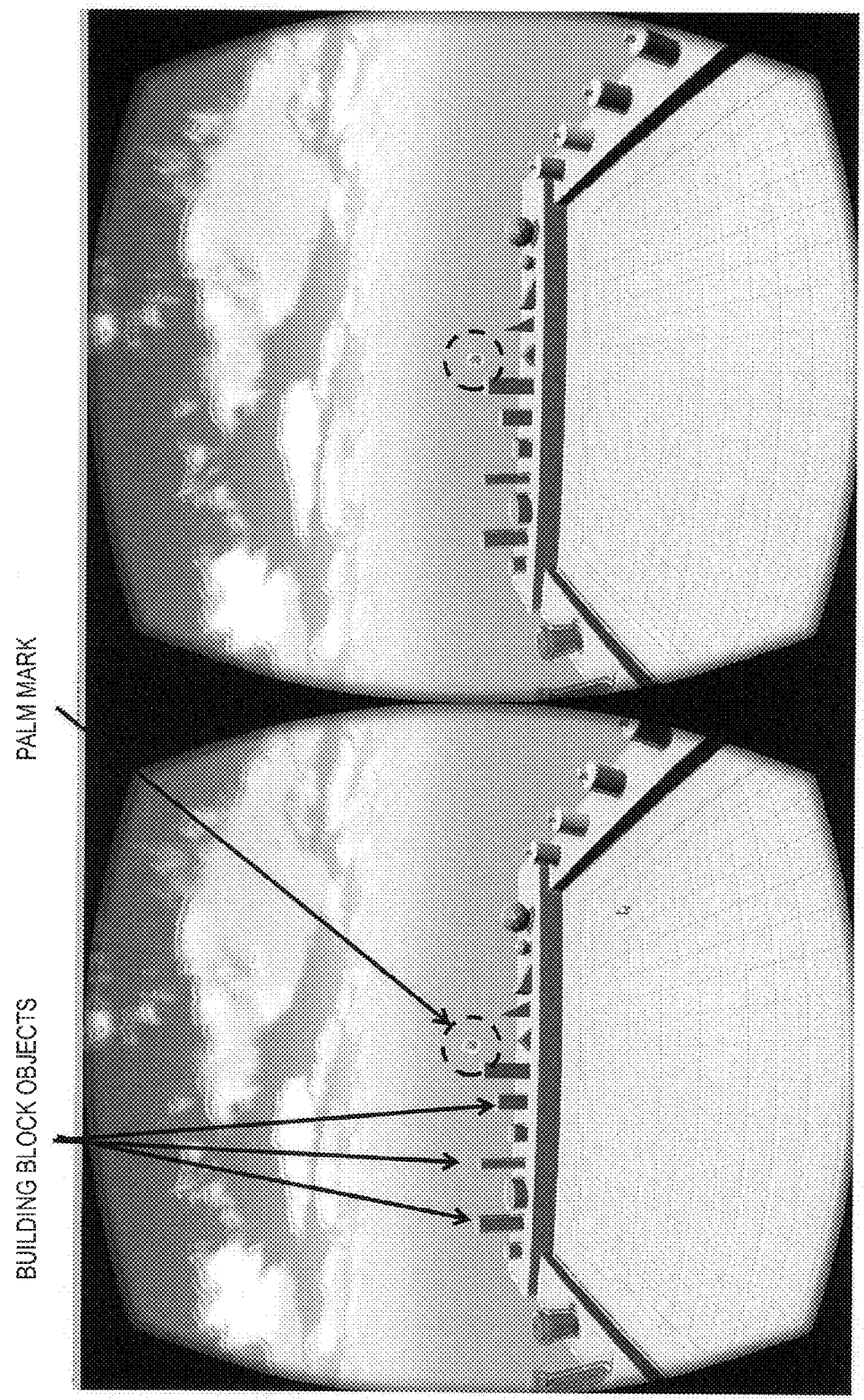
FIG. 11 shows an example of a screen image relating to object manipulation in the three-dimensional virtual space according to at least one embodiment.
Figure 12:
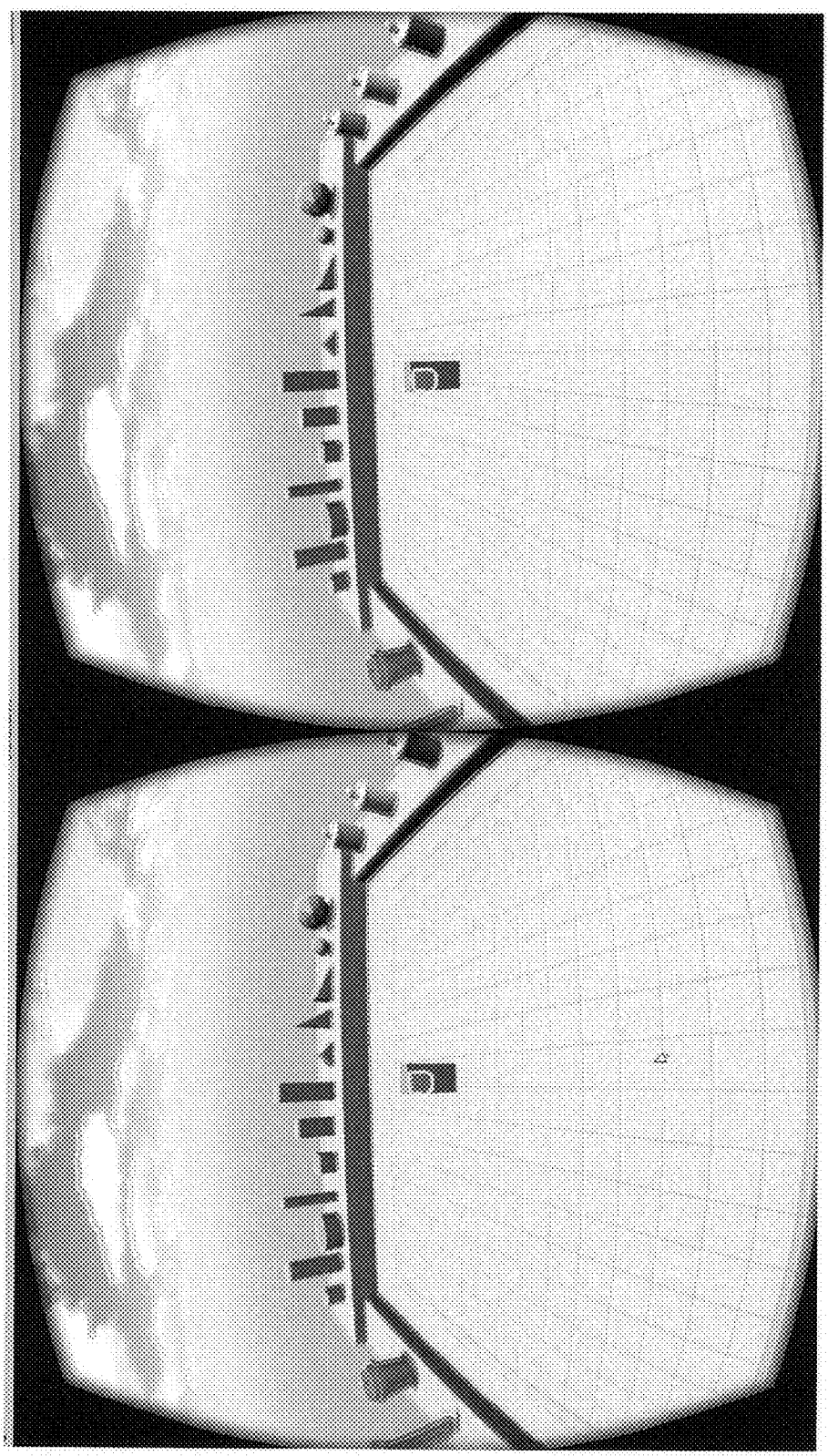
FIG. 12 shows another example of the screen image relating to object manipulation in the three-dimensional virtual space according to at least one embodiment.
Figure 13:
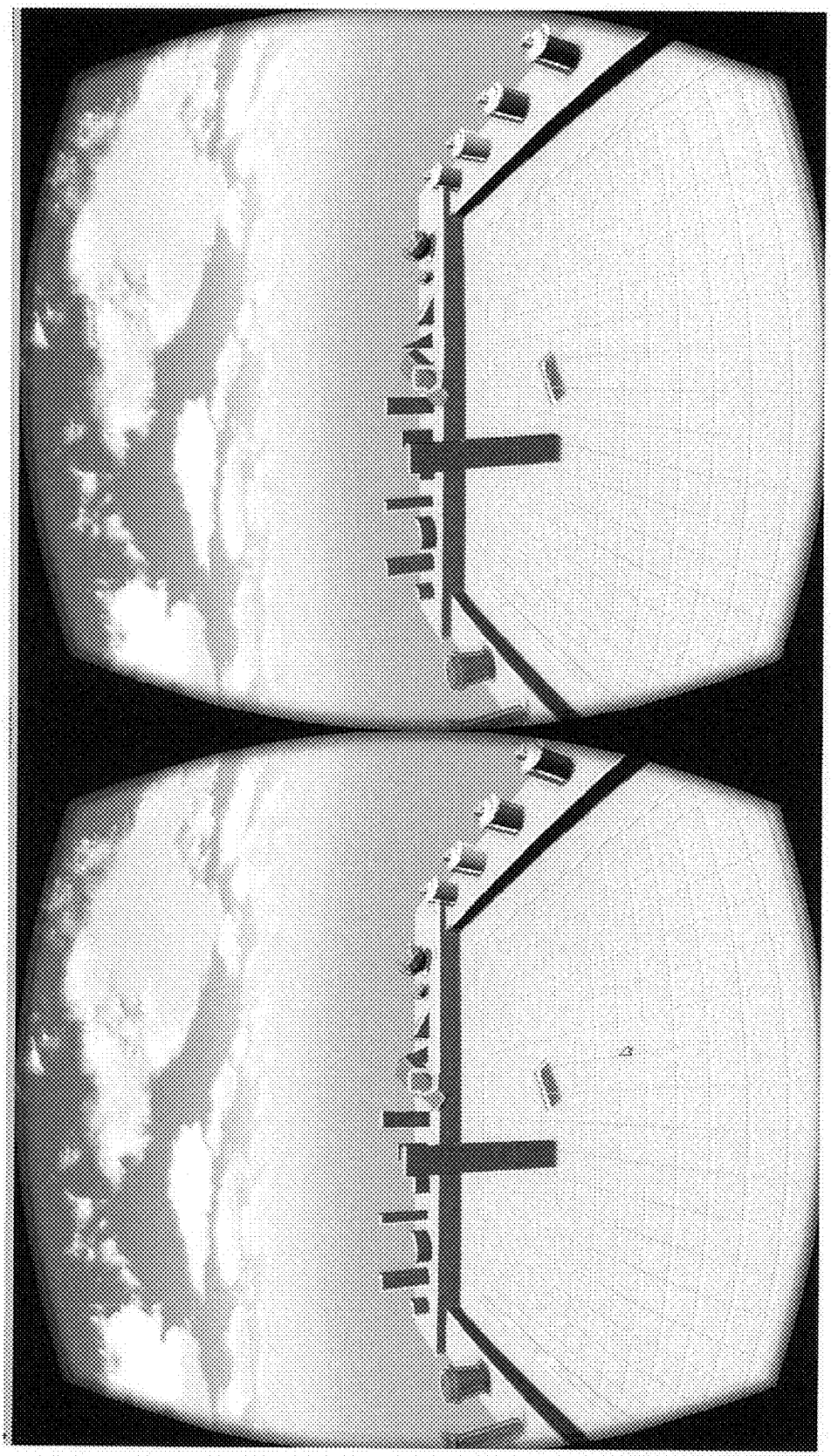
FIG. 13 shows another example of the screen image relating to object manipulation in the three-dimensional virtual space according to at least one embodiment.

The sight determination section 220 determines sight information of the virtual cameras in the three-dimensional virtual space on the basis of three-dimensional virtual space information stored in the spatial information storage section 250, angular information sensed with the inclination sensor 114, and sensed information in the direction of the field of view of the virtual cameras based on the position information sensed with the position sensor 130. The sight image generation section 230 can then generate a sight image of part of a 360-degree panoramic image on the basis of the determined sight information. As the sight image, two two-dimensional images for the right and left eyes are generated and superimposed on each other in the HMD, and the superimposed image displayed in the HMD is presented to the user in the form of a three-dimensional image, as shown in FIGS. 11 to 13.

Referring back to FIG. 4, the object control section 240 identifies an object to be manipulated on the basis of object information of an object in the three-dimensional virtual space that is stored in the object information storage section 260, information from the sensors 114/130, and the user's instructions from the external controller 140. The object control section 240 receives an instruction of predetermined user operation to be performed on the identified object to be manipulated, adjusts virtual camera information stored in the virtual camera information storage section 270 and manipulates the object to be manipulated, and outputs a result of the manipulation to the display 112 of the HMD. Specific processes of the object manipulation will be described in association with FIG. 5 and the following figures.

In FIG. 4, elements drawn as functional blocks that carry out a variety of processes can be configured by a CPU, a memory, and other integrated circuits in a hardware sense and can be achieved by a variety of programs loaded in the memory in a software sense. A person skilled in the art therefore understands that these functional blocks can be achieved by any of the hardware, the software, and a combination thereof (the same holds true for FIG. 8, which will be described later).

Figure 5:
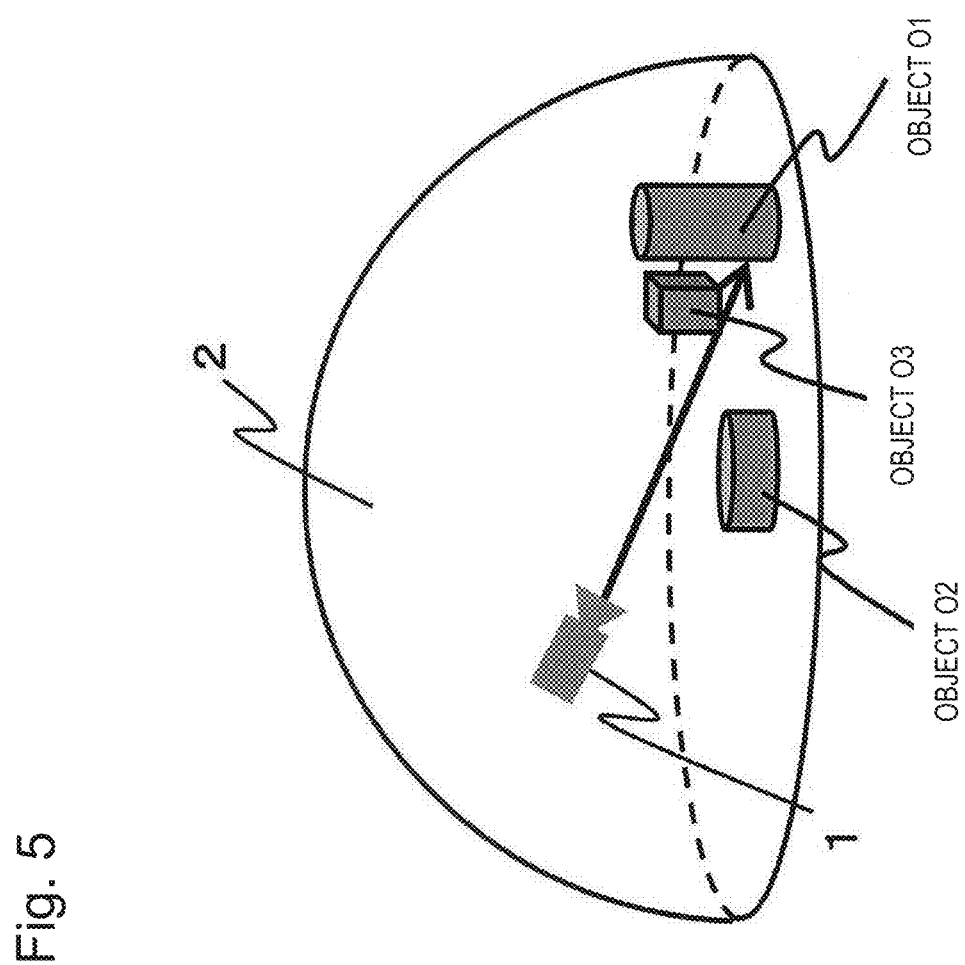
FIG. 5 is a stereoscopic outline view diagrammatically showing an example of the arrangement of a virtual camera and objects in the three-dimensional virtual space according to at least one embodiment.

The process of identifying an object to be manipulated and the process of manipulating the object to be manipulated that are carried out by the sight determination section 220, the sight image generation section 230, and the object control section 240 shown in FIG. 4 will be described in detail with reference to FIGS. 5 to 10. FIG. 5 is a stereoscopic view diagrammatically showing an example of the arrangement of a virtual camera 1, cylindrical objects O1 and O2, and a cubic object O3 in an immersive three-dimensional virtual space 2 according to at least one embodiment. The sight captured with the virtual camera 1 is displayed as the sight image in the display of an immersed user. Since the head of the user who wears the HMD inclines downward, the virtual camera 1 is also oriented to a point below a horizontal line, as shown in FIG. 5. The cylindrical object O1 is placed at the front end of the (arrowed) center line of the sight. Further, the cylindrical object O2 is placed on the right in the sight, and the cubic object O3 is placed on the left in the sight.

Figure 6:
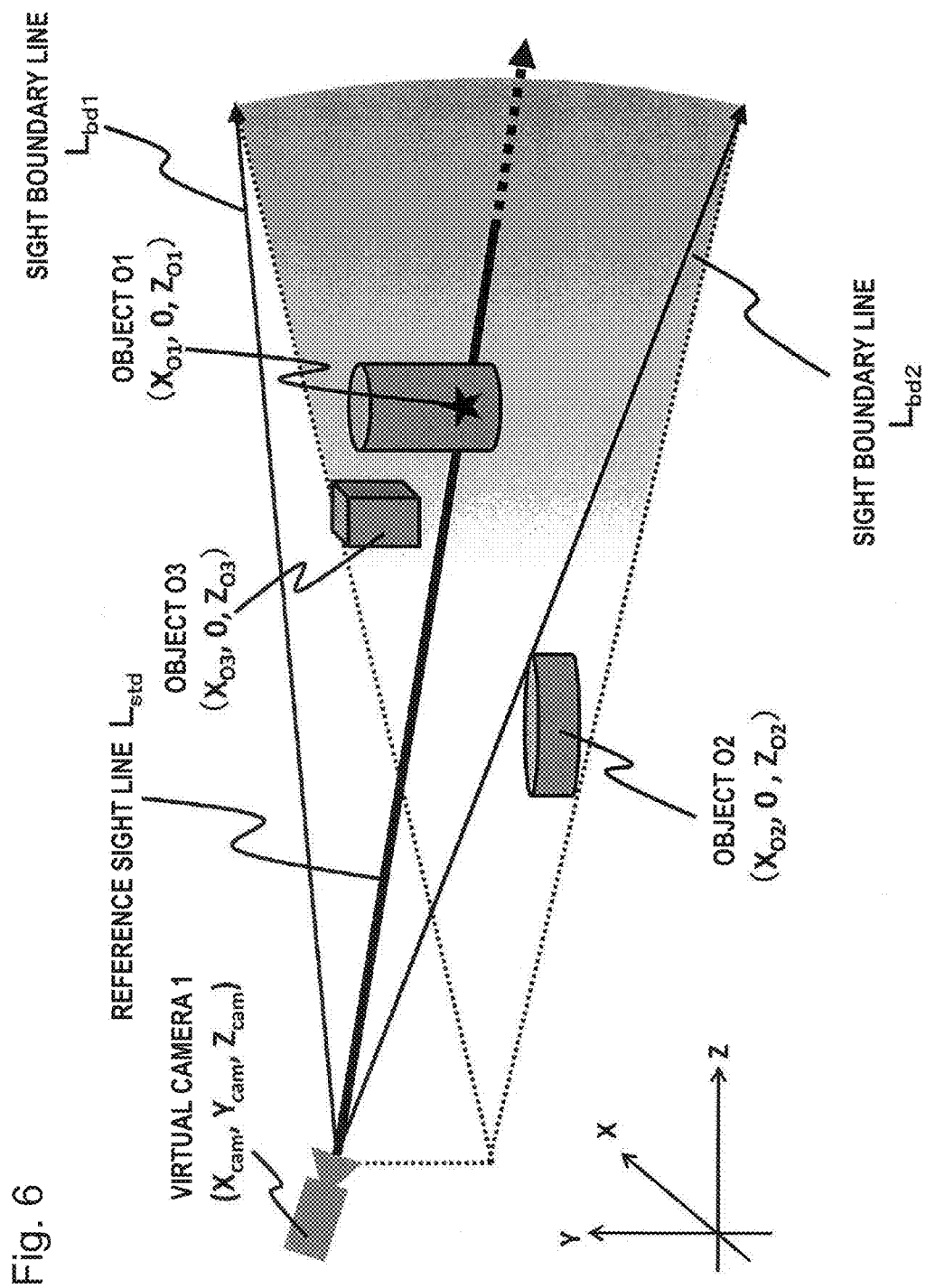
FIG. 6 is a stereoscopic outline view diagrammatically showing an example of the arrangement of a virtual camera and objects in the three-dimensional virtual space according to at least one embodiment.

FIG. 6 shows the arrangement in the diagrammatic view of FIG. 5 in detail. As shown in FIG. 6, in a virtual space in which a horizontal plane is defined by the XZ coordinates and the vertical direction is defined by the Z axis, the virtual camera 1 is placed in a position ($X_{cam}$, $Y_{cam}$, $Z_{cam}$). The coordinates of the position are determined on the basis of the position information sensed with the position tracking camera. The field of view of the virtual camera 1 has a predetermined range, and the sight is defined on the basis of the range of the field of view. A sight image is generated on the basis of the defined sight. A sight reference sight line $L_{std}$ and sight boundary lines $L_{bd1}$ and $L_{bd2}$ with respect to the reference sight line are defined. The reference line $L_{std}$ is so defined as to correspond to a predetermined position (a central point, for example) in the sight image.

The objects O1 to O3 are placed in a position ($X_{O1}$, 0, $Z_{O1}$), a position ($X_{O2}$, 0, $Z_{O2}$), and a position ($X_{O3}$, 0, $Z_{O3}$), respectively, in the XZ plane by way of example. Since an object, of course, has a fixed size, the coordinate position of the object may be defined in the form of a coordinate range. In the relationship in the example in FIG. 6 between the position and orientation of the virtual camera and the positions where the objects are placed, the object O1 is placed on the reference sight line $L_{std}$. As a result, the object O1 is identified as an object to be manipulated.

Figure 7A:
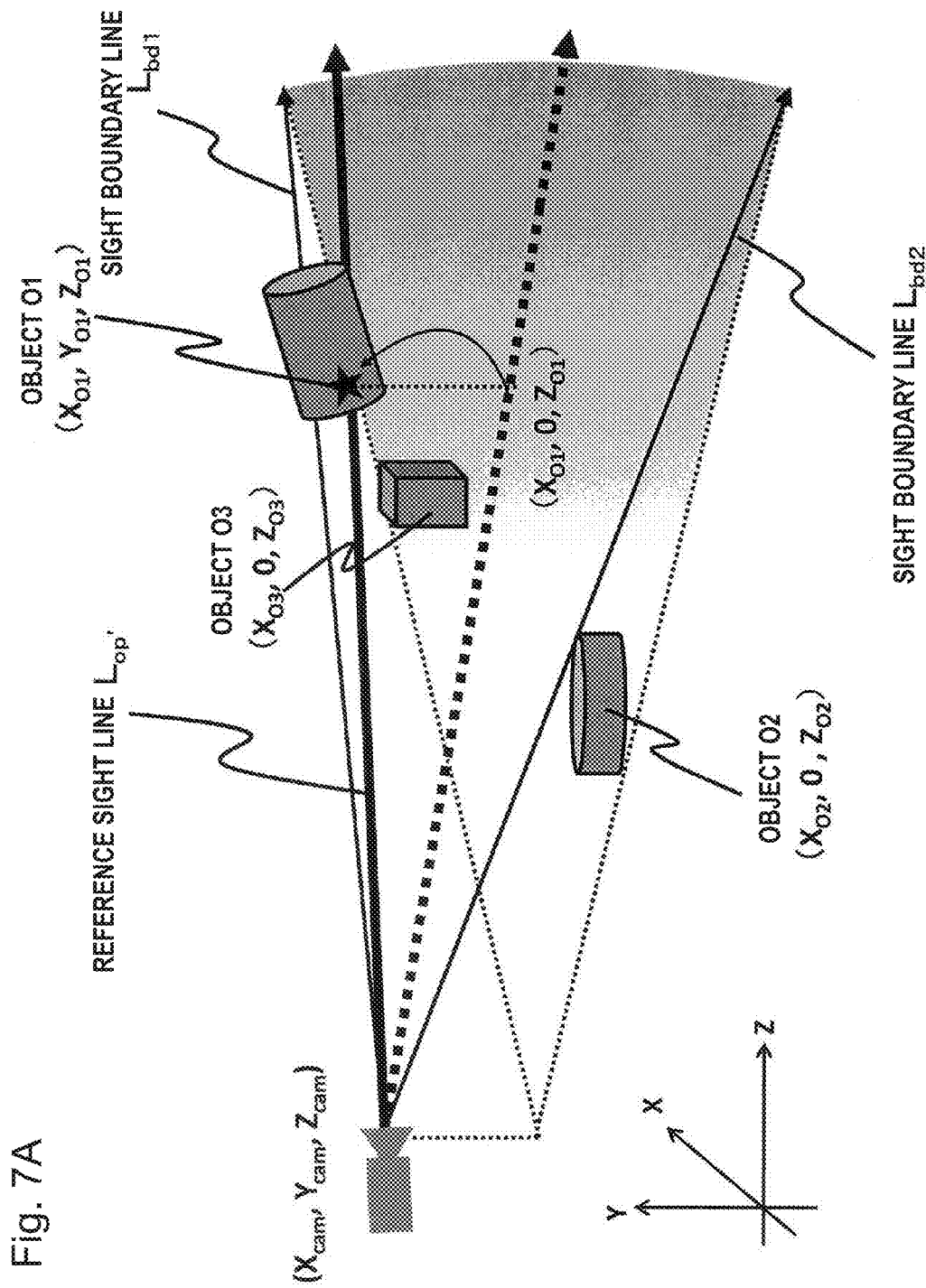
FIG. 7A is a stereoscopic outline view diagrammatically showing an example of manipulation of the virtual camera and the object in the three-dimensional virtual space according to at least one embodiment.
Figure 7B:
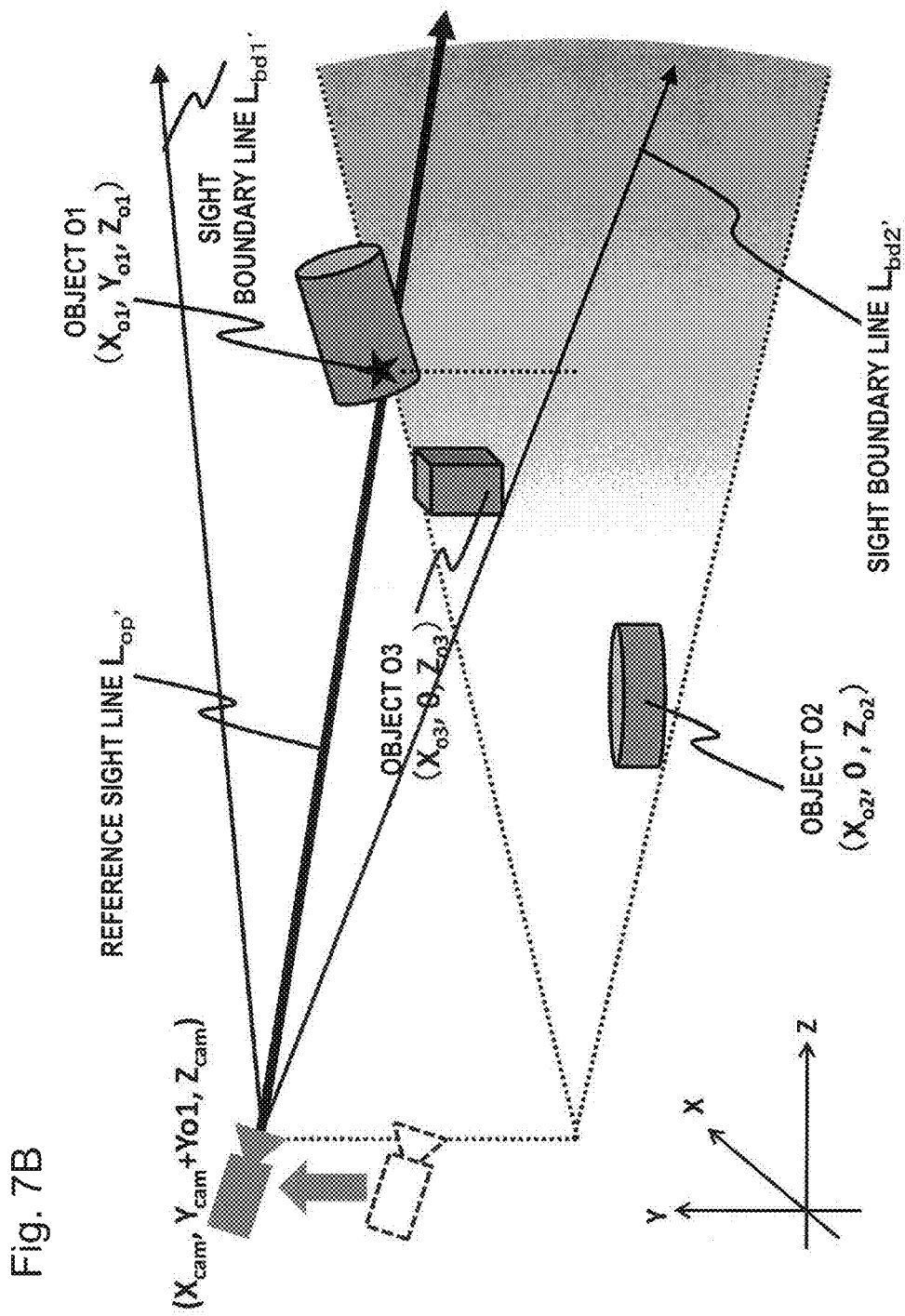
FIG. 7B is a stereoscopic outline view diagrammatically showing another example of manipulation of the virtual camera and the object in the three-dimensional virtual space according to at least one embodiment.

FIGS. 7A and 7B each show an outline of manipulation performed on the object O1 identified in FIG. 6. FIG. 7A diagrammatically shows an example of manipulation of the virtual camera and the object in the three-dimensional virtual space according to at least one embodiment. When the object O1 to be manipulated is identified, the position of the virtual camera 1 is fixed, as shown in FIG. 7A. In this state, when the user performs HMD action of further inclining the head, object manipulation related in advance to the action is performed on the object O1. In the description, the user performs HMD inclining action of moving the head in the vertical direction, and the object O1 is moved also in the three-dimensional virtual space in accordance with the distance of the head movement in the Y-axis direction to a position having coordinates ($X_{O1}$, $Y_{O1}$, $Z_{O1}$). In this process, the orientation of the virtual camera is adjusted in terms of angle also in the Y-axis direction in such a way that a reference sight line $L_{OP'}$ always gives a sight reference position (for example, the central position in the sight image is maintained).

In FIG. 7A, an object O1' having moved in the Y-axis direction is further rotated. The object rotation can also be related to predetermined HMD inclining action (action of inclining HMD in horizontal direction, for example), as in the object movement. The object rotation can instead be related to predetermined action performed on the external controller 140 (swiping on touch display, for example).

FIG. 7B diagrammatically shows another example of manipulation of the virtual camera and the object in the three-dimensional virtual space according to at least one embodiment. In the example in FIG. 7A, after the object O1 to be manipulated is identified, the position of the virtual camera 1 is fixed, and the orientation of the camera is then adjusted. In contrast, in the example in FIG. 7B, the position of the virtual camera is not fixed, but the orientation thereof is fixed. That is, when the object O1 is moved in the Y-axis direction to the position having the coordinates ($X_{O1}$, $Y_{O1}$, $Z_{O1}$), the position of the virtual camera 1 is also moved in the Y direction to the position having coordinates ($X_{cam}$, $Y_{cam+}Y_{O1}$, $Z_{cam}$).

The control of the position and orientation of a virtual camera is not limited to the process example in FIG. 7A or 7B. That is, a person skilled in the art should understand that there can be employed any process aspect in which the position and/or orientation of a virtual camera is so adjusted that the reference sight line $L_{OP'}$ always gives the sight reference position (for example, the central position in the sight image is maintained).

Figure 8:
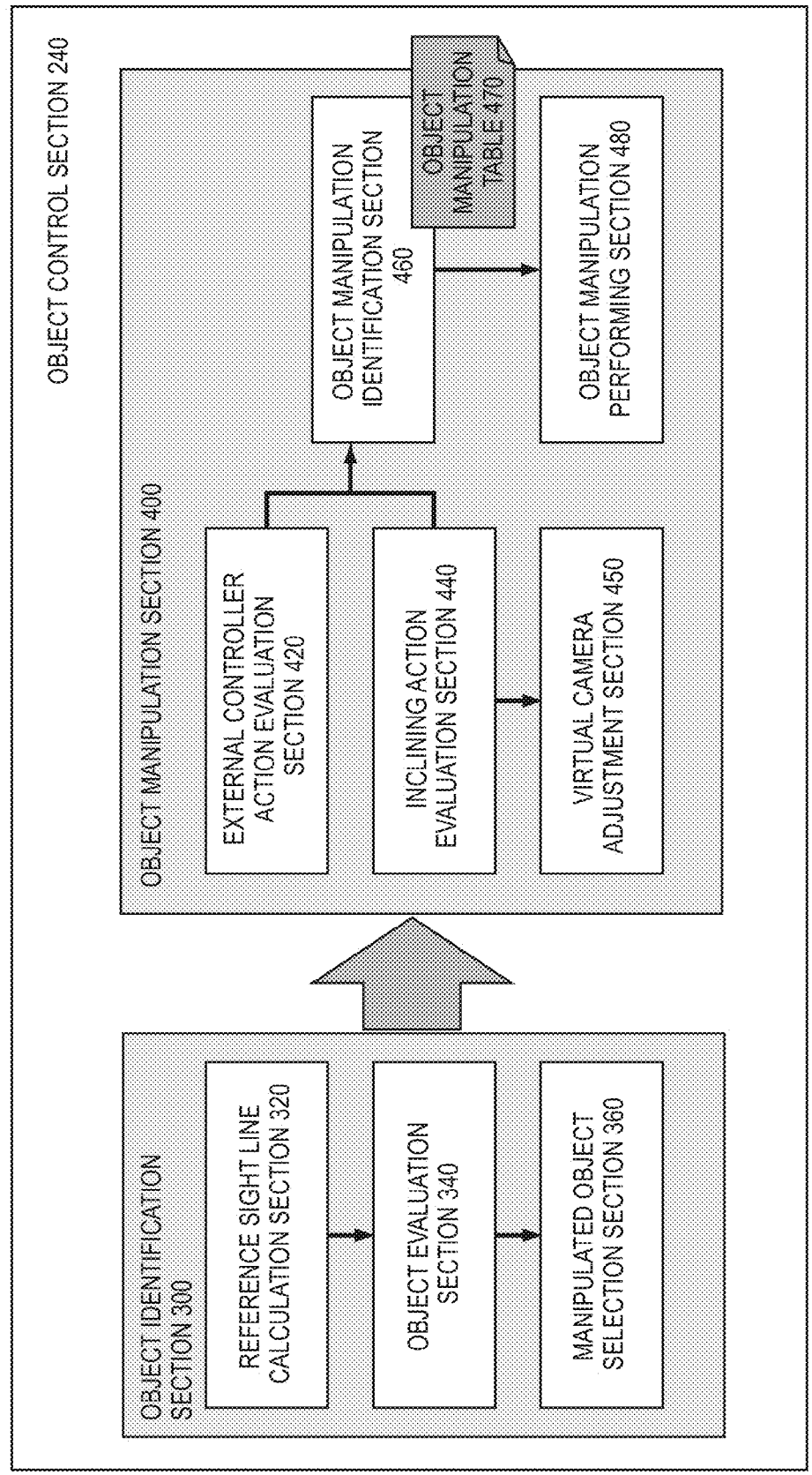
FIG. 8 is a block diagram showing a functional configuration of an object control section according to at least one embodiment.
Figure 10:
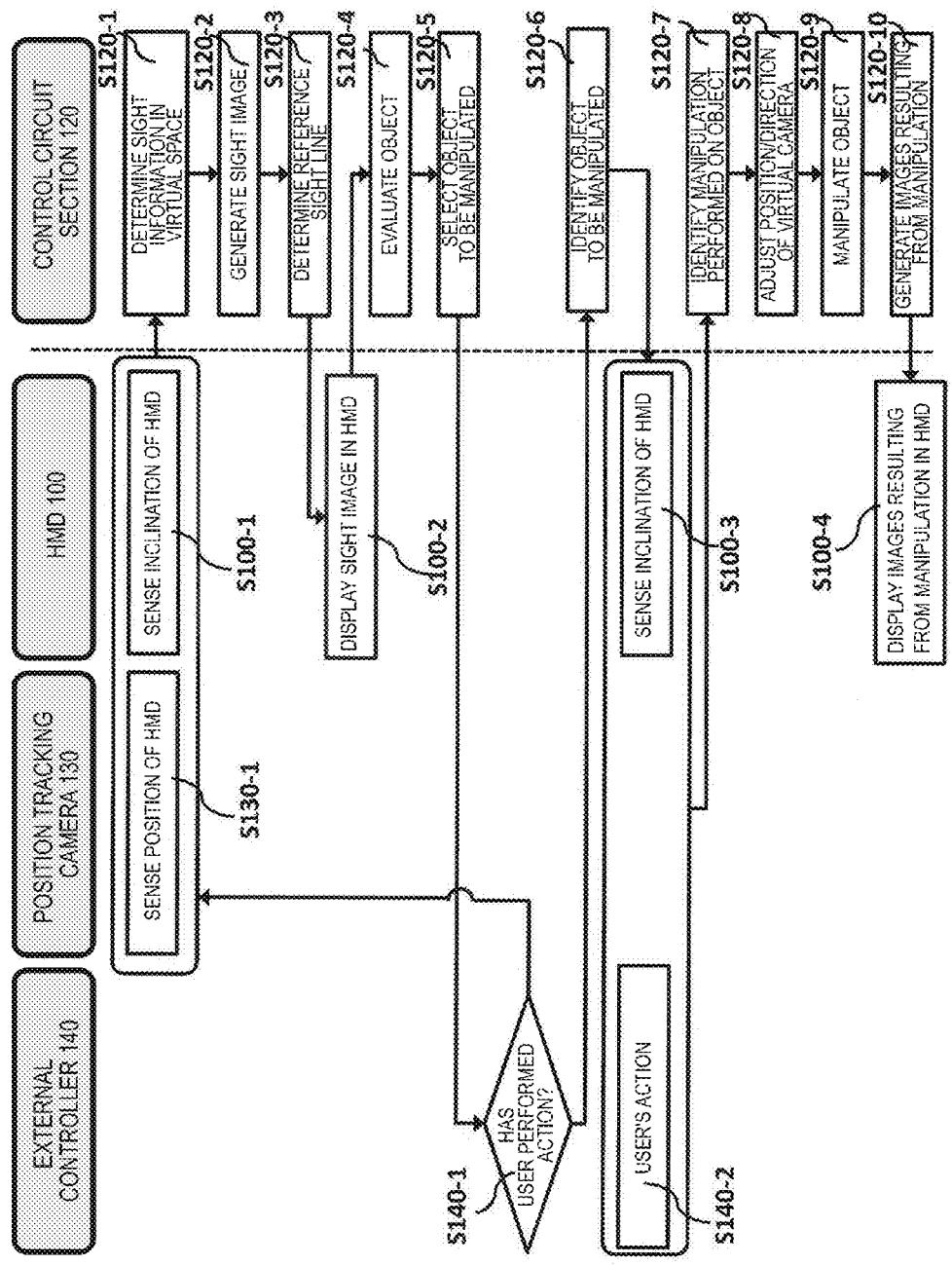
FIG. 10 is a flowchart of processes for object manipulation in the three-dimensional virtual space according to at least one embodiment.

Processes relating to the object manipulation in the three-dimensional virtual space having been described above with reference to FIGS. 6, 7A, and 7B will be described in more detail with reference to FIGS. 8 to 10. FIG. 8 is a detailed functional block diagram showing blocks that form the object control section 240 having been described with reference to FIG. 4. The object control section 240 includes an object identification section 300 for identifying an object to be manipulated and an object manipulation section 400 for manipulating the identified object to be manipulated, as shown in FIG. 8.

The object identification section 300 identifies an object placed on the reference sight line shown in FIG. 6 in the three-dimensional virtual space on the basis of the user's HMD inclining action. To this end, the object identification section 300 includes a reference sight line calculation section 320, which calculates a reference sight line that is present in the three-dimensional virtual space and related to a reference point in a sight image, an object evaluation section 340, which evaluates whether an object is placed on the reference sight line, and a manipulated object selection section 360, which selects the object as an object to be manipulated if the object is placed on the reference sight line.

On the other hand, the object manipulation section 400 responds to the identification of an object to be manipulated performed by the object identification section 300 and performs on the object to be manipulated manipulation according to the user's action of inclining the head around which the HMD is worn in a predetermined direction. To this end, the object manipulation section 400 includes an external controller action evaluation section 420, which evaluates whether the external controller has received the user's touch action, an inclining action evaluation section 440, which evaluates the user's HMD inclining action (inclination direction), a virtual camera adjustment section 450, which adjusts the position or direction of a virtual camera when object manipulation is performed, an object manipulation identification section 460, which identifies object manipulation performed on an object to be manipulated in accordance with an object manipulation table 470, and an object manipulation performing section 480, which performs the object manipulation to generate a sight image.

The object manipulation identification using the object manipulation table 470 will be described with reference to FIG. 9. FIG. 9 is a schematic view showing an example of correspondence between the user's action and object manipulation, on the basis of which the object manipulation table 470 is created. When the manipulated object selection section 360 selects an object to be manipulated, and the user continuously performs "tapping" on the external controller, the object to be manipulated can be "caught" in the three-dimensional virtual space. The "tapping" is presented only by way of example, and there may be used any other HMD action or input action that is performed by the user and can be uniquely related to object manipulation in a state in which an object to be manipulated is selected.

Object manipulation after the "catching" described above can be determined in accordance with the object manipulation table 470. The user's action includes not only the HMD inclining action (column) but also touch action performed on the external controller (row), and combinations of these types of user's action allow identification of object manipulation. For example, in a case where the HMD action is "upward or downward inclination" and the user further performs "tapping" on the touch display as external controller action, the overall action is taken as an "object releasing" action instruction. Similarly, in a case where the HMD action is "upward or downward inclination" and the user further performs "swiping" in cooperation with the external controller, the overall action is taken by the object manipulation identification section 460 as an "object rotating" action instruction; when the user further performs "holding" on the external controller, the overall action is taken as an "object upward or downward movement" action instruction; and when the user further performs nothing as external controller action, the overall action is taken as an "object frontward or rearward movement" action instruction. The object manipulation performing section 480 then performs each of the action instructions.

The HMD action is not limited to "upward or downward inclination" and may be any inclination action that is uniquely identifiable. Further, only one of HMD inclining action and external controller action may be accepted as the user's action and related to object manipulation. However, in a case where it is desired to provide a large number of object manipulation types, it is preferable to use combinations of HMD inclining action and external controller action. The user's HMD inclining action, which can be performed only by causing the user who wears the HMD to move his/her own head, is easy for the user. Further, it can be said that touch action performed on the external controller is also easy for the user because the user only needs to perform "tapping," "swiping," or "holding" in any position on the touch display.

The procedure of the processes for object manipulation in the three-dimensional virtual space according to at least one embodiment will next be described in detail with reference to FIG. 10. The object manipulation processes are achieved by interaction among the external controller 140, the position tracking camera (position sensor) 130, the HMD 110, and the computer (control circuit section) 120.

In the object manipulation processes, the motion sensing section 210 senses a variety of pieces of information on the HMD. That is, in step S130-1, the position sensor connected to the computer 120 and capable of sensing the HMD senses the position of the HMD 110. In step S100-1, the inclination sensor provided in the HMD connected to the computer 120 senses the inclination of the HMD 110. In step S120-1, the motion sensing section 210 determines the position information and the inclination information, and the sight determination section 220 determines the sight information in the three-dimensional virtual space on the basis of the position information and/or the inclination information on the HMD 110 described above.

After the sight information is determined, in the subsequent step S120-2, the sight image generation section 230 generates a sight image to be displayed in the HMD on the basis of the sight information described above. Further, in step S120-3, the reference sight line calculation section 320 determines the reference sight line $L_{std}$. The reference sight line $L_{std}$ is determined in correspondence with a predetermined position in the sight image. The predetermined position is preferably but not necessarily the central point of the sight image and may be any settable position in the sight image. Further, the reference point is preferably so displayed in the form of a mark of some kind (palm icon, for example) as to be superimposed on the sight image described above.

Thereafter, in step S100-2, the sight image is displayed in the HMD. A plurality of objects each of which is a candidate of an object to be manipulated later are displayed in the sight image. In the state in which the sight image is displayed in the HMD, the user who wears the HMD performs head inclining action to perform positioning in such a way that at least one of the plurality of objects placed in the three-dimensional virtual space corresponds to the predetermined position in the sight image.

In step S120-4, the object evaluation section 340 evaluates whether at least one object has been positioned in the predetermined position described above in the sight image; that is, whether an object has been placed on the reference sight line in the three-dimensional space. In the case where an object has been placed on the reference sight line, in step S120-5, the manipulated object selection section 360 selects the object as an object to be manipulated. If a plurality of objects placed on the reference sight line are present, the manipulated object selection section 360 may select one object closest to the position of the virtual camera in the three-dimensional virtual space; that is, the point of view.

In step S140-1, it is evaluated whether the user has performed touch action ("tapping," in particular) on the external controller 140 after the selection of the object in step S120-5. In the case where the user has performed touch action, in step S120-6 the object identification section 300 responds to the touch action, and identification of an object to be manipulated is completed. In this state, the sight image is displayed in the HMD in an aspect in which the user has "caught" the object to be manipulated. On the other hand, in the case where the user has performed no touch action, the control returns to step S130-1 and step S100-1 in the initial stage, and the information on the position and inclination of the HMD is continuously sensed.

In the state in which the user has caught the object to be manipulated, the user further performs external controller action (step S140-2) and HMD inclining action (step S100-3). In response to the action, the external controller action evaluation section 420 and the inclining action/direction evaluation section 440 perform action evaluation, and in step S120-7, the object manipulation identification section 460 identifies corresponding manipulation performed on the object to be manipulated. The corresponding manipulation has been described with reference to FIG. 9. Unique object manipulation is determined on the basis a combination of HMD inclining action; for example, in the vertical direction (HMD upward or downward inclination action) and external controller action.

In step S120-8 and the following steps, actual manipulation is performed on the object to be manipulated, and a result of the manipulation is displayed in the HMD. That is, in step S120-8, the virtual camera adjustment section 450 adjusts the position and direction of the virtual camera shown in FIGS. 7A and 7B. In the subsequent step S120-9, the object manipulation performing section 480 performs specific manipulation on the object to be manipulated, as shown in FIGS. 7A and 7B again. In step S120-10, a series of images resulting from the manipulation are generated, and in step S100-4, the images resulting from the manipulation are displayed in the HMD in a time course.

Examples of Screen Display

On the basis of the above description, FIGS. 11 to 13 show screen examples displayed in the HMD that are implemented on the basis of at least one embodiment and relate to object manipulation in the three-dimensional virtual space. In the examples, assume a building block game application that allows manipulation of building block objects placed in an immersive three-dimensional virtual space. More specifically, assume a building block game application in which HMD head action is related to manipulation of moving a building block object in a specific direction or any other manipulation so that the user can manipulate the building block object by moving the head around which the HMD is worn. In FIGS. 11 to 13, two images for the right and left eyes are displayed, and when the images are displayed in the HMD, they are superimposed on each other as if the user sees a three-dimensional image, as described above.

In FIG. 11, a large number of building block objects are placed on a plane in the three-dimensional virtual space. Further, a mark having a palm shape is displayed at the center of a sight image. The user then performs HMD inclining action for positioning in such a way that the mark overlaps with any of the building block objects to advance the game. The user selects a single building block object in the positioning process and then combines HMD inclining action with external controller action to manipulate the building block object in accordance with an object manipulation rule, such as those shown in FIGS. 7A and 7B. FIG. 12 shows a state in which the selected, caught building block object is moved to a predetermined position. FIG. 13 shows a state in which a single building block object is lifted upward by HMD inclining action in the vertical direction and the lifted building block object is to be stacked on another building block object placed in a position adjacent to the lifted building block object.

As described above, according to the present disclosure, simple action of the head of a user who wears an HMD allows object manipulation in an immersive three-dimensional virtual space. Further, combining head action using the HMD with external controller action allows more complicated object manipulation. Based on the features described above, the present disclosure can provide a novel game operation aspect in a game application using an HMD.

At least one embodiment has been described above, but the present disclosure is not limited to the at least one embodiment described above. A person skilled in the art will understand that a variety of modification can be made to the at least one embodiment without departing from the spirit and scope of the present disclosure set forth in the claims.

DESCRIPTION OF SYMBOLS

1 Virtual camera
2 Immersive three-dimensional virtual space
100 HMD system
110 HMD
112 Display
114 Inclination sensor (gyro sensor)
120 Computer (control circuit section)
130 Position sensor (position tracking camera)
140 External controller
210 Motion sensing section
220 Sight determination section
230 Sight image generation section
240 Object control section
250 Spatial information storage section
260 Object information storage section
270 Virtual camera information storage section
300 Object identification section
320 Reference sight line calculation section
340 Object evaluation section
360 Manipulated object selection section
400 Object manipulation section
420 External controller action evaluation section
440 Inclining action evaluation section
450 Virtual camera adjustment section
460 Object manipulation identification section
470 Object manipulation table
480 Object manipulation performing section

What is claimed is:

1. A computer comprising a CPU and a memory having a computer program stored therein wherein the computer program, when executed by the CPU causes the CPU to perform operations comprising:
   determining information on a sight in a three-dimensional virtual space based on three-dimensional virtual space information stored in the memory and information on inclination sensed with an inclination sensor provided in a head mounted display connected to the computer;
   generating an image of the sight in the three-dimensional virtual space based on the sight information in order to display the sight image in the head mounted display;
   identifying an object in the generated sight image placed on a reference sight line in the generated sight image in the three-dimensional virtual space, the reference sight line being determined in correspondence with a predetermined position in the generated sight image; and
   manipulating the identified object in the three-dimensional virtual space in accordance with action of inclining the head mounted display in a predetermined direction.

2. The computer according to claim 1, wherein the determining sight information based further on information on a position of the head mounted display that is sensed with a position sensor connected to the computer and capable of sensing the head mounted display.

3. The computer according to claim 1, wherein in a case where a plurality of objects are placed on the reference sight line, the identifying an object in the generated sight image comprises selecting an object closest to a point of view in the three-dimensional virtual space.

4. The computer according to claim 1, wherein the predetermined position is set at a central point of the sight image.

5. The computer according to claim 1, wherein the predetermined direction is a vertical direction.

6. The computer according to claim 1, wherein the manipulating the identified object in the three-dimensional virtual space comprises manipulating the identified object in cooperation with an external controller connectable to the computer.

7. The computer according to claim 6, wherein the external controller includes a touch display, and the manipulation performed on the identified object in cooperation with the external controller is performed in accordance with touch action including any of tapping, swiping, and holding performed on the touch display.

8. A computer system comprising a computer and a head mounted display connected to the computer and including an inclination sensor, wherein the computer is configured to perform operations comprising:

determining information on a sight in a three-dimensional virtual space based on stored three-dimensional virtual space information and information on inclination sensed with the inclination sensor, generating an image of the sight in the three-dimensional virtual space based on the sight information in order to display the sight image in the head mounted display, identifying an object in the generated sight image placed on a reference sight line in the generated sight image in the three-dimensional virtual space, the reference sight line being determined in correspondence with a predetermined position in the generated sight image, and manipulating the identified object in the three-dimensional virtual space in accordance with action of inclining the head mounted display in a predetermined direction.

9. The computer system according to claim 8, further comprising a position sensor connected to the computer and capable of sensing the head mounted display, wherein the sight information is determined based further on information on a position of the head mounted display sensed with the position sensor.

10. The computer system according to claim 8, further comprising an external controller connectable to the computer, wherein the manipulation performed on the identified object is performed in accordance with touch action performed on a touch display provided in the external controller.

11. A non-transitory computer-readable medium having a computer program stored therein, the computer program when read and executed by a processor causing the processor to perform operations comprising:

determining information on a sight in a three-dimensional virtual space based on stored three-dimensional virtual space information and information on sensed inclination of a head mounted display;

generating an image of the sight in the three-dimensional virtual space based on the sight information in order to display the sight image in the head mounted display;

identifying an object in the generated sight image placed on a reference sight line in the generated sight image in the three-dimensional virtual space, the reference sight line being determined in correspondence with a predetermined position in the generated sight image; and manipulating the identified object in the three-dimensional virtual space in accordance with action of inclining the head mounted display in a predetermined direction.

* * * * *